March 19, 1935. J. M. QUINN 1,995,010
MEANS FOR INCREASING POWER
Filed Aug. 26, 1933
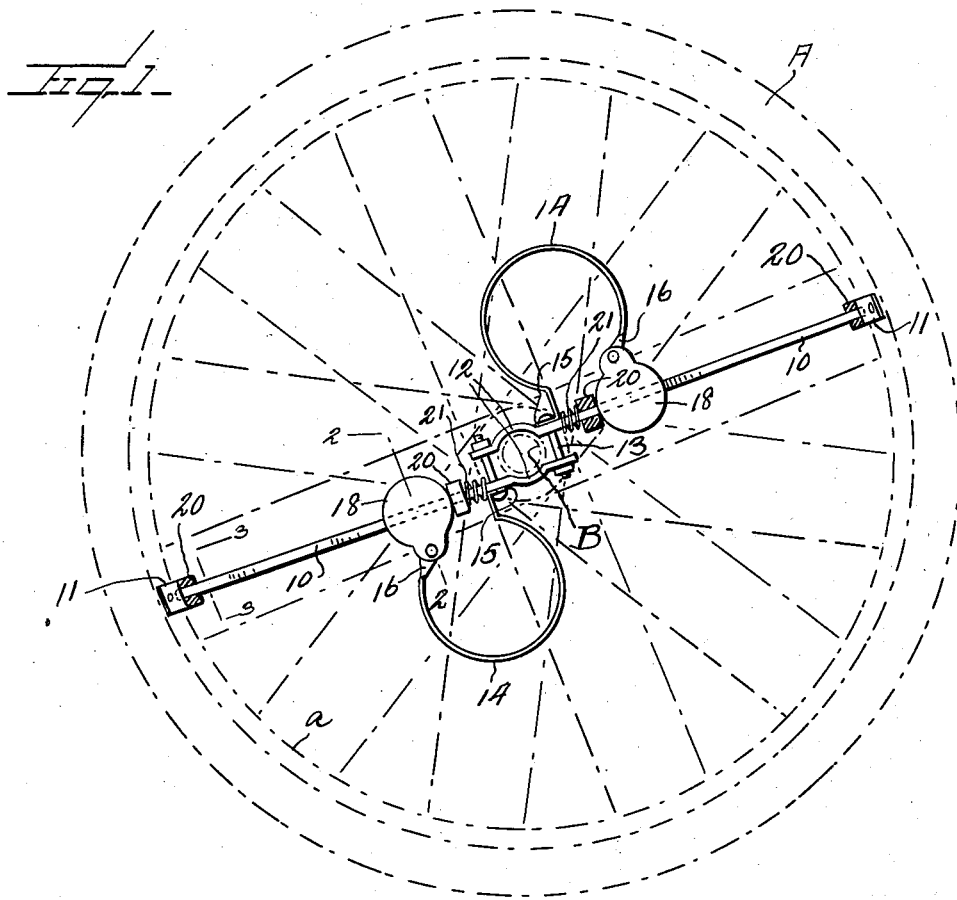
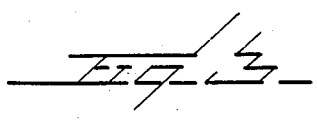
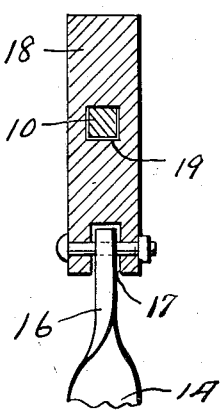
Inventor
*J. M. Quinn*
By *Watson E. Coleman*
Attorney Patented Mar. 19, 1935

1,995,010

UNITED STATES PATENT OFFICE 1,995,010

MEANS FOR INCREASING POWER

Joseph M. Quinn, Philadelphia, Pa.

Application August 26, 1933, Serial No. 686,976

2 Claims. (Cl. 74—572)

This invention relates to devices for increasing power of rotating bodies such as fly wheels, bicycle wheels and the like and particularly to the provision of weights mounted upon the wheel and adapted to be forced outward by centrifugal force as the wheel rotates to thereby increase the inertia of the wheel and decrease the power necessary to be applied thereto.

One of the objects of the invention is to provide a very simple device which may be readily applied to bicycle wheels, fly wheels, or other power wheels which consists of a plurality of guide rods adapted to be readily connected to the rim of a wheel and to the hub of a wheel, these guide rods carrying thereon sliding weights provided with springs whereby the weights will be retracted as the speed decreases and whereby the weights will be thrown outward to increase the inertia of the rotating body as the speed increases.

Other objects will appear in the course of the following description.

My invention is illustrated in the accompanying drawing, wherein:—

Figure 1 is a side elevation in dotted line of a fly-wheel showing my invention applied thereto in full lines, the clips and rubber bumpers being in section;

Figure 2 is a sectional view on the line 2—2 of Figure 1;

Figure 3 is a section on the line 3—3 of Figure 1.

Referring to the drawing, it will be seen that I provide in the example illustrated two guide rods 10, each of which is connected at its outer end to the rim of the wheel at diametrically opposite points in relation to the other guide rod, the inner end of each guide rod 10 being operatively engaged with the hub of the wheel so that the guide rods will rotate with the wheel. To this end, the outer end of each guide rod is provided with a clip designated generally 11 which arches over the rim $a$ of the wheel A and may be attached thereto by rivets, screws or in any other suitable manner. The inner end of each rod 10, which rod is preferably square, is formed with the arcuate offset portion 12 to fit over the hub B of the wheel. The inner ends of the rods 10 extend in approximately parallel relation and are held upon the hub of the wheel by the bolts 13 passing through the rods on each side of the arcuate portions thereof.

Associated with each rod is a normally nearly circular spring 14, the inner end of which is angularly bent as at 15 for the passage of one of the bolts 13. The opposite end of the spring is flattened as at 16 and is received within a bifurcated portion 17 of a weight 18 which has a square passage 19 through it through which the rod 10 passes. Each weight is freely slidable upon the rod.

The springs 14 tend to urge the weights inward while centrifugal force, of course, would act to urge them outward against the action of the spring. Mounted on each rod is a rubber bumper 20 supported by a coil spring 21, this coil spring bearing against the inner end of the spring 14 or against the corresponding bolt 13. This acts to take up any shock due to the sudden inward movement of the weights 20 when the wheel ceases to revolve.

The operation of this mechanism will be readily understood. Normally the weights are in the position shown in Figure 1 but as the wheel is rotated, the weights will move further out from the center until at a high speed, the weights will be on the extreme outer ends of the rods and these weights will, of course, assist the inertia of the rapidly revolving wheel and thus reduce the energy necessary to be applied to the wheel and secure an increase of power.

While I have illustrated this as being applied to a bicycle wheel, I do not wish to be limited to this as it might be applied to fly wheels or power wheels of various kinds.

I claim:—

1. The combination with a wheel having a rim and a hub, of two guide rods, each attached at its outer end to the rim of the wheel and at its inner end engaging partially around the hub, the rods extending approximately in diametrically different directions, means clamping said rods upon the hub, means for attaching the rods to the rim, weights slidingly mounted upon the rods, and nearly circular leaf springs attached at their inner ends to the rods and at their outer ends being pivotally engaged with the weights, the springs acting to urge the weights inward but permitting outward movement of the weights under centrifugal force, and cushioning bumpers mounted adjacent the inner ends of the rods and against which the weights impact under the action of the springs.

2. The combination with a wheel having a rim and a hub, of two guide rods, each attached at its outer end to the rim of the wheel and at its inner end being concavely curved to engage partially around the hub, the rods extending approximately in diametrically different directions, means clamping said rods upon the hub, means for attaching the rods to the rim, weights slidingly mounted upon the rods, and nearly circular leaf springs attached at their inner ends to the rods and at their outer ends being pivotally engaged with the weights, the springs acting to urge the weights inward but permitting outward movement of the weights under centrifugal force, and cushioning bumpers mounted adjacent the inner ends of the rods and against which the weights impact under the action of the springs, each bumper comprising an elastic block slidingly mounted on the rod, and a coiled compression spring disposed behind the block and resisting its inward movement.

JOSEPH M. QUINN.